R. A. MOORE.
ANTISKIDDING DEVICE FOR AUTOMOBILES.
APPLICATION FILED SEPT. 27, 1910.
995,026.
Patented June 13, 1911.
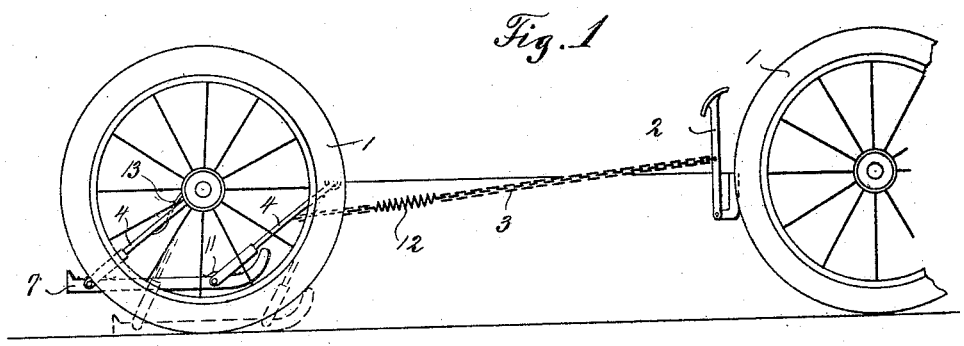
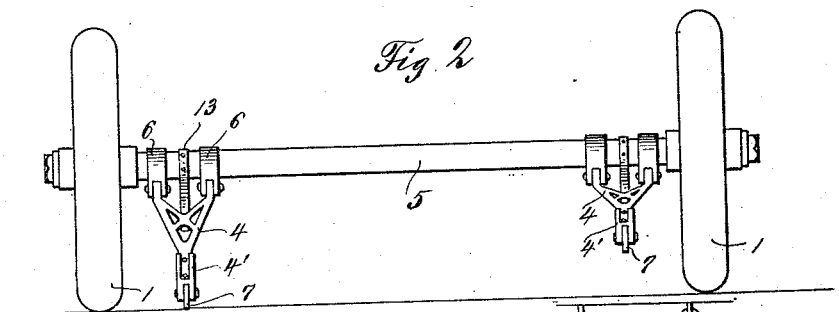
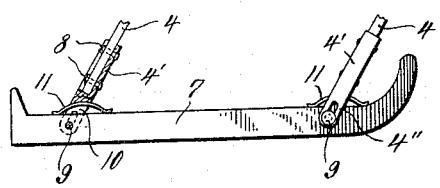
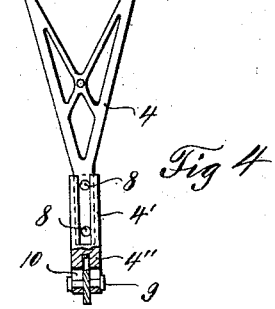

UNITED STATES PATENT OFFICE.

ROBERT ALEXANDER MOORE, OF CHICAGO, ILLINOIS, ASSIGNOR TO MOORE AUTO SKID PREVENTER COMPANY, OF NEW YORK, N. Y., A CORPORATION OF NEW YORK.

ANTISKIDDING DEVICE FOR AUTOMOBILES.

995,026.     Specification of Letters Patent.    Patented June 13, 1911.

Application filed September 27, 1910. Serial No. 584,138.

*To all whom it may concern:*

Be it known that I, ROBERT ALEXANDER MOORE, a citizen of the United States, residing at Chicago, in the county of Cook and State of Illinois, have invented certain new and useful Improvements in Antiskidding Devices for Automobiles, of which the following is a specification.

This invention consists of certain improvements in anti-skidding devices particularly designed for use on automobiles or similar vehicles, and of the type adapted to be controlled by the operator of the vehicle whereby the device, consisting generally of a shoe for contact with the surface over which the vehicle travels, may be moved at will into and out of operative contact with respect to said surface.

The essential feature of the invention resides in the special form of shoe employed, including the peculiar manner of mounting the same on the vehicle.

For a full understanding of the present invention, reference is to be had to the following detail description and to the accompanying drawings, in which—

Figure 1 is a view diagrammatically showing the lower portion of a motor vehicle, and illustrating the invention applied thereto; Fig. 2 is a rear elevation, one of the anti-skidding devices being shown in operation, and the other in an inoperative position; Fig. 3 is a side elevation of the shoe, the link brackets supporting the same being partly broken away, and one being shown in section; Fig. 4 is a detail view of one of the link brackets broken away to show the connection between the shoe and the lower end of said bracket; Fig. 5 is a cross-sectional view illustrating the preferred form of shoe.

Describing the essential features of the present invention in detail, 1 in the drawings denotes the wheels of the vehicle, and the latter will have mounted thereon in any suitable way a foot lever or similar operative device 2 connected by a flexible connection such as a chain 3 with the front link bracket 4 of a pair of such brackets which are carried by the sleeve 5, in which the rear drive axle of the vehicle operates. The brackets 4 are preferably of somewhat V-form, and the rear brackets are pivoted, at their upper ends to clamps 6 secured to the part 5 in any substantial manner and the forward ones at any suitable point in the vehicle. One or more of the devices comprising the present invention may be carried by the sleeve 5, but for heavy vehicles, a pair of the devices should preferably be employed.

Each anti-skidding device comprises the link brackets 4 aforesaid, and a shoe 7 pivotally connected with the lower ends of said brackets. If desired, the brackets 4 may be made with a lowermost section 4' having a socket to receive the lower end of the upper section, suitable detachable fastenings 8 being employed to connect the sections. The shoe 7 consists of a narrow elongated body, preferably a hardened metal plate of sufficient vertical thickness to afford a firm resistance to lateral skidding movement of the vehicle when the shoe is operated by the lever 2 so as to engage the surface over which the vehicle travels. The lower ends of the brackets 4 are bifurcated as shown at 4'' and between said bifurcated portions is received the shoe 7, pivot members 9 passing through slots 10 in the bifurcated portions as well as through the body of the shoe. Springs 11 are employed to yieldingly press the shoe toward the ends of the brackets 4, said springs being preferably of a flat type and interposed between the upper end of the bifurcation at the lower end of each bracket and the upper surface of the shoe.

It will be apparent that the structure above described is very substantial in that the shoe is supported very rigidly by the spaced link brackets 4 when said shoe is in operative contact with the surface of the ground. The yielding members 11 as well as the spring 12 in the length of the connection 3 permit the shoe 7 to move upward slightly should it meet with any rigid obstruction. The rear end of the shoe is upturned and the front end curves upwardly also for obvious reasons. A spring or similar member 13 normally holds each of the shoes 7 above the surface of the ground.

The preferred form of the shoe 7 is illustrated in Fig. 5, wherein the shoe is shown of inverted V-form, its legs straddling a section of the roadway and adapted especially by their form to bite in and secure a firm anti-skidding grip thereon.

Having thus described the invention, what is claimed as new is:

1. In combination, a vehicle, and an antiskidding device carried thereby comprising spaced link brackets pivotally connected with the vehicle at their upper ends, a shoe carried by the lower ends of said brackets, and an operating device for forcing the shoe downwardly and including a yieldable connection.

2. In combination, a vehicle, and an antiskidding device carried thereby comprising spaced link brackets pivotally connected with the vehicle at their upper ends, a shoe carried by the lower ends of said brackets, an operating device for forcing the shoe downwardly and including a yieldable connection, and means yieldably supporting the shoe on the brackets.

3. In combination, a vehicle, and an antiskidding device carried thereby comprising spaced link brackets pivotally connected with the vehicle at their upper ends, a shoe carried by the lower ends of said brackets, an operating device for forcing the shoe downwardly and including a yieldable connection, means yieldably supporting the shoe on the brackets, and a yielding device for normally holding the shoe in an inoperative elevated position.

In testimony whereof I affix my signature in presence of two witnesses.

ROBERT ALEXANDER MOORE.

Witnesses:
 SIEGBERT LEWIS,
 CHAS. STERNHEIM.